United States Patent [19]

Lester et al.

[11] Patent Number: 5,357,481
[45] Date of Patent: Oct. 18, 1994

[54] BOREHOLE LOGGING TOOL

[75] Inventors: Robert A. Lester; Paul G. Junghans; Donald J. Hilliker; Mathew G. Schmidt; Jose R. Casarsa; Gregory J. Wilkinson, all of Houston, Tex.

[73] Assignee: Western Atlas International, Inc., Houston, Tex.

[21] Appl. No.: 971,225

[22] Filed: Nov. 4, 1992

[51] Int. Cl.$^5$ .............................................. G01V 1/40
[52] U.S. Cl. ........................................ 367/31; 367/75; 367/912; 181/104
[58] Field of Search ........................ 367/25, 31, 35, 75, 367/86, 912; 181/102, 104; 310/331

[56] References Cited

U.S. PATENT DOCUMENTS

| | | | |
|---|---|---|---|
| 3,333,238 | 7/1967 | Caldwell | 340/18 |
| 3,517,768 | 6/1970 | Straus | 181/104 |
| 4,383,308 | 5/1983 | Caldwell | 367/31 |
| 4,516,228 | 5/1985 | Zemanek | 367/75 |
| 4,649,525 | 3/1987 | Angona et al. | 367/31 |
| 4,782,910 | 11/1988 | Sims | 181/106 |
| 4,813,028 | 3/1989 | Liu | 367/31 |
| 4,832,148 | 5/1989 | Becker et al. | 181/104 |
| 4,834,209 | 5/1989 | Vogel et al. | 181/105 |
| 4,949,316 | 8/1990 | Katahara | 367/157 |
| 5,042,611 | 8/1991 | Howlett | 181/104 |
| 5,159,578 | 10/1992 | Lenhardt et al. | 367/31 |
| 5,229,553 | 7/1993 | Lester et al. | 181/102 |

OTHER PUBLICATIONS

J. Zemanek, D. M. Williams, D. P. Schmidt, Shear Wave Logging Using Multiple Sources, Mobil Research and Development Corporation, Dallas, Texas, The Log Analyst, May–Jun. 1991.

Sales Brochure "Multiple Array Acoustilog" [MAC], Atlas Wireline Services.

Zemanek et al., Proc of 14th Ann. Conven., Oct. 10, 1985, Indonesian Petr. Assoc. pp. 565–568.

Primary Examiner—Nelson Moskowitz
Attorney, Agent, or Firm—William A. Knox

[57] ABSTRACT

A logging-tool assembly for generating both flexural wavefields and compressional wavefields in the sidewall formations encountered by a borehole. The assembly consists of a sonde constructed of a plurality of segments that are axially rotatable with respect to each other. Each one of two of the segments includes a compartment in which is mounted a dipole bender bar transmitting transducer. Two additional segments each contain one or more binaurally sensitive receiver transducers. Monopole transmitting and receiving transducers are also included in the respective appropriate segments. An acoustic isolator of novel construction acoustically separates the transmitting transducers from the receiving transducers.

11 Claims, 7 Drawing Sheets

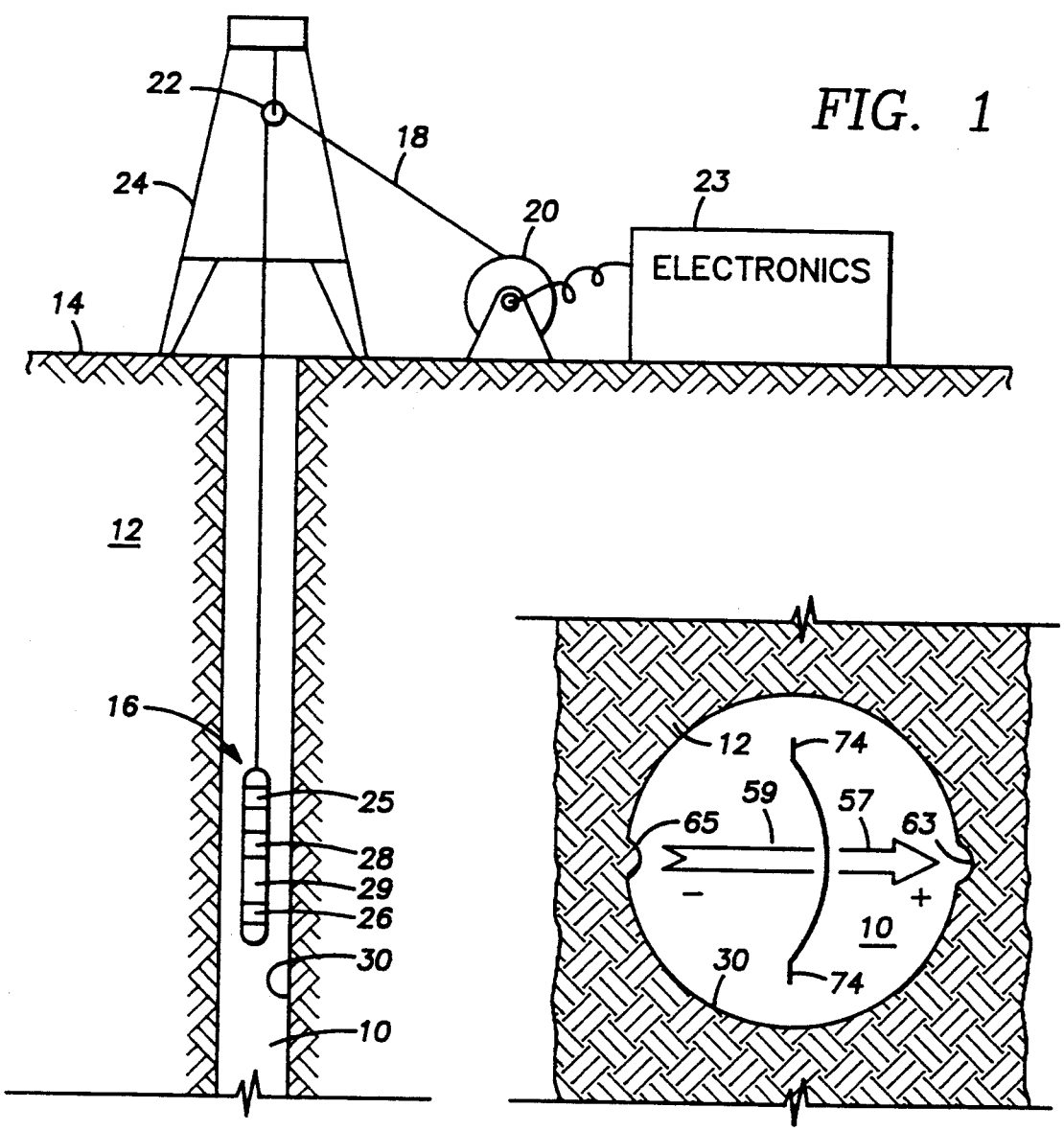
FIG. 1
FIG. 3B
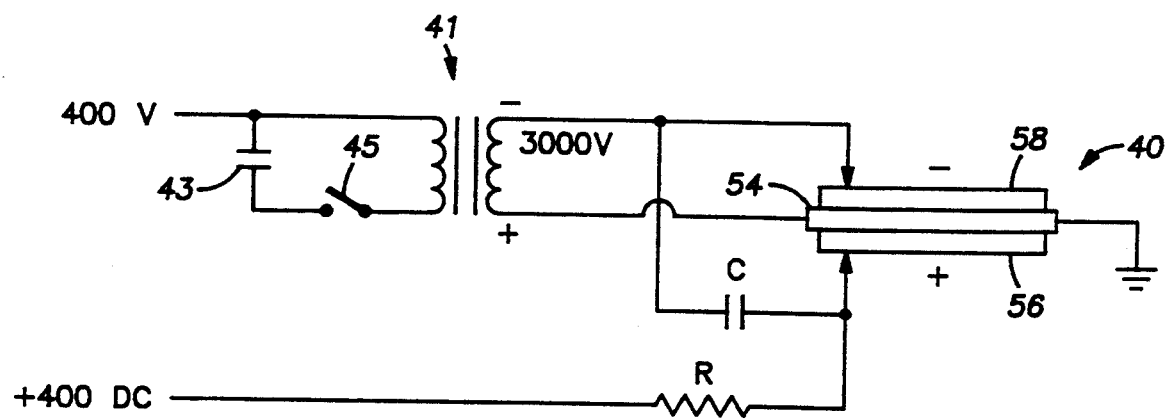
FIG. 9

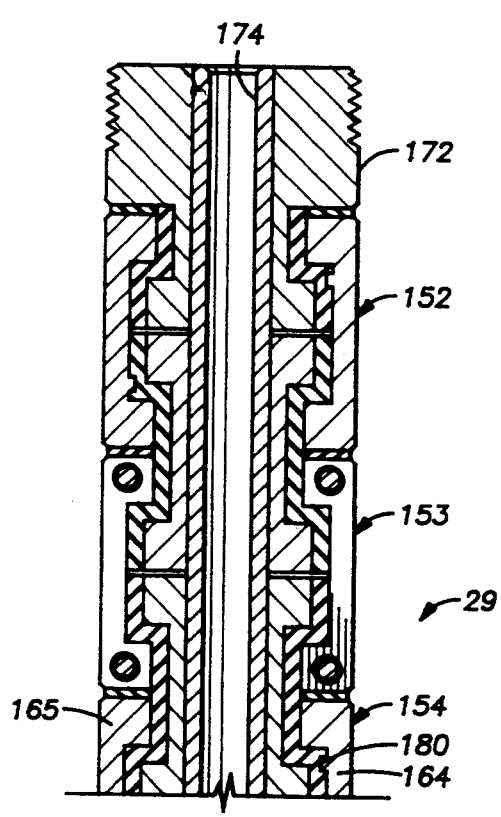
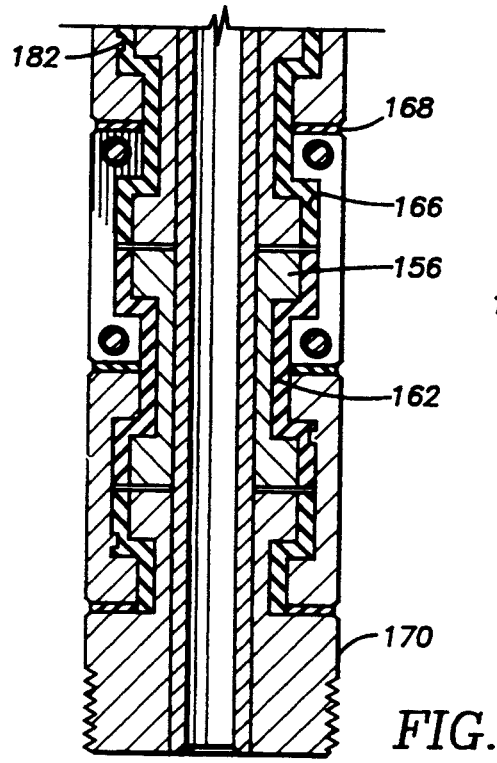
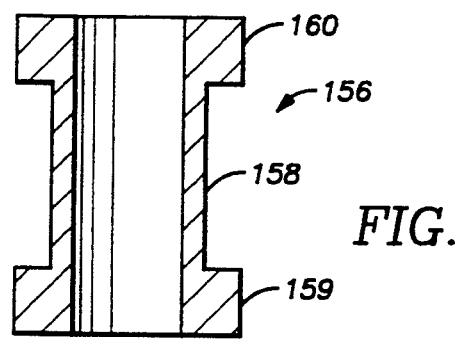
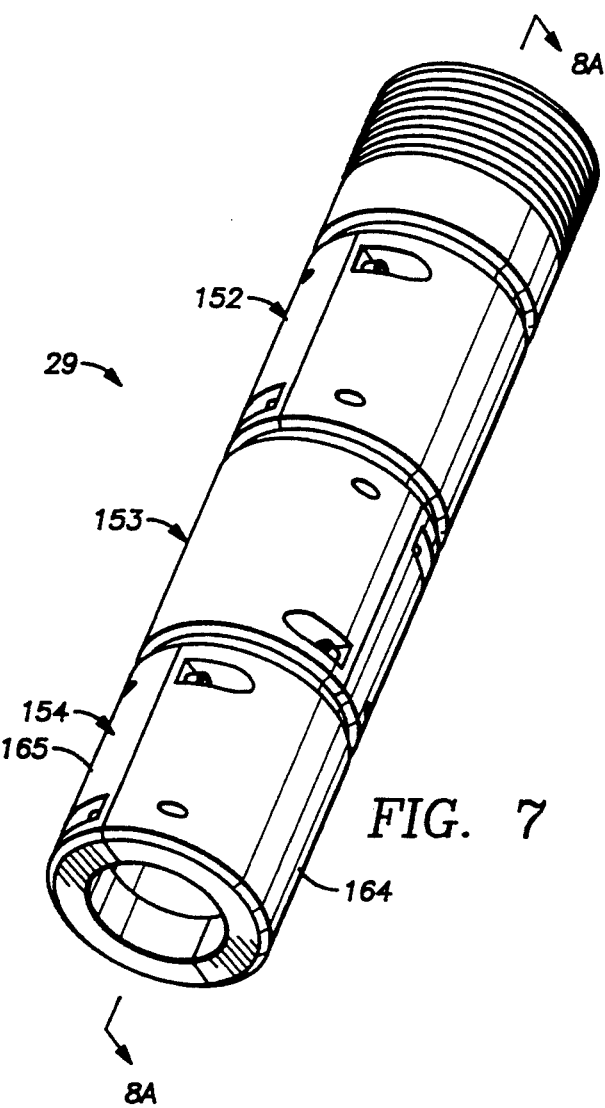
FIG. 8B
FIG. 7
FIG. 8A

BOREHOLE LOGGING TOOL

RELATION TO OTHER APPLICATIONS

This application is related to application Ser. No. 07/970,674, now U.S. Pat. No. 5,229,553, issued Jul. 20, 1993 to R. A. Lester et al., filed concurrently herewith and assigned to the same assignee as this invention.

BACKGROUND OF THE INVENTION

1. Field of the Invention

Disclosed is an improved acoustic downhole logging tool for measuring certain rock parameters indicative of selected properties of the sidewall material of a borehole, in both cased and in open holes. The tool is particularly useful in circumstances where the sidewall material is characterized by an acoustic velocity that is lower than the propagation velocity of an acoustic pulse in the borehole fluids.

2. Discussion of Related Art

Acoustic logging tools for measuring properties of the sidewall material of both cased and uncased boreholes are well known. Essentially such tools measure the travel time of an acoustic pulse propagating through the sidewall material over a known distance. In some studies, the amplitude and frequency of the acoustic pulse, after passage through the earth, are of interest.

In its simplest form, an acoustic logger consists of one or more transmitter transducers that periodically emit an acoustic pulse into the formation around the borehole. One or more receiver transducers, spaced apart by a known distance from the transmitter, hears the pulse after passage through the surrounding formation. The difference in time between pulse transmission and pulse reception divided into the distance between the transducers is the formation velocity. If the transducers do not contact the borehole sidewall, allowance must be made for time delays through the borehole fluid.

Throughout this disclosure, the term "velocity", unless otherwise qualified, shall be taken to mean the velocity of propagation of an acoustic wavefield through an elastic medium. The term does not mean the velocity of motion of a medium.

Acoustic wavefields propagate through elastic media in different modes. The modes include: Compressional or P-waves, wherein particle motion is in the direction of wave travel; transverse shear or S-waves, which, assuming a homogeneous, isotropic medium, may be polarized in two orthogonal directions, with motion perpendicular to the direction of wave travel; Stonley waves, which are guided waves that propagate along the fluid-solid boundary of the borehole; and compressional waves that propagate through the borehole fluid itself. There also exist asymmetrical flexural waves as will be discussed later.

P-waves propagate through both fluids and solids. Shear waves cannot exist in a fluid. Compressional waves propagating through the borehole fluid may be mode-converted to shear waves in the borehole sidewall material by Snell's law refraction provided the shear-wave velocity of that material is greater than the compressional-wave velocity of the borehole fluids. If that is not true, then shear waves in the sidewall material can be generated only by direct excitation.

Among other parameters, the various modes of propagation are distinguishable by their relative velocities. The velocity of compressional and transverse shear waves is a function of the elastic constants and the density of the medium through which the waves travel. The S-wave velocity is, for practical purposes, about half that of P-waves. Stonley waves may be somewhat slower than S-waves. Compressional wavefields propagating through the borehole fluid are usually slower than formational shear waves but for boreholes drilled into certain types of soft formations, the borehole fluid velocity may be greater than the sidewall formation S-wave velocity. The velocity of flexural waves is said to approach the S-wave velocity as an inverse function of the acoustic excitation frequency. Some authors refer to flexural waves as pseudo-Raleigh waves.

In borehole logging, a study of the different acoustic propagation modes provides diagnostic information about the elastic constants of the formation, rock texture, fluid content, permeability, rock fracturing, the goodness of a cement bond to the well casing and other data. Typically, the output display from an acoustic logging tool takes the form of time-scale recordings of the wave train as seen at many different depth levels in the borehole, each wave train including many overlapping events that represent all of the wavefield propagation modes. For quantitative analysis, it is necessary to isolate the respective waveform modes. S-waves are of particular interest. But because the S-wave arrival time is later than the P-wave arrival time, the S-wave event often is contaminated by later cycles of the P-wave and by interference from other late-arriving events. Therefore, known logging tools are designed to suppress undesired wavefields either by judicious design of the hardware or by post-processing using suitable software.

In one form of tool, the transmitter and receiver transducers are mounted in pads that contact the sidewall of the borehole. Both P-waves and S-waves are generated but not other undesirable waves. The P-waves are gated out by an electronics package, leaving only the S-waves. The problem with that arrangement is not only wear on the pads and excess friction when the tool is drawn up the borehole, but also the frictional road noise that is generated by the passage of the tool through the borehole. Therefore, modern tools are centered in the borehole and transmit acoustic pulses through the drilling fluid into the sidewall by refraction.

R. L. Caldwell, in U.S. Pat. No. 3,333,328, issued Jul. 25, 1967, teaches use of a tool that is suspended centrally in the borehole, separated from the sidewall. He employs cylindrical transducers to generate and to receive S-waves by refraction at the borehole-wall interface. To avoid acoustic interference with other arrivals, he employs delay-gating to preferentially isolate the desired signals such as S-waves.

In U.S. Pat. No. 4,813,028, issued Mar. 14, 1989 to O. Y. Liu, there is described an acoustic well logging apparatus that utilizes a rare earth acoustic cylindrical transducer to provide low frequency acoustic energy within the borehole so that characteristics of subsurface formations may be obtained. The parameters of formation permeability are determined by measuring the attenuation of Stonley waves produced by the transducer. It is of interest that Liu recognizes the existence of flexural waves but complains that those waves interfere with the desired Stonely-waves and he seeks to suppress the flexural waves.

Many of the later workers in the art prefer to use flat-plate, bender bar transducers as being capable of providing direct excitation of flexural waves in the borehole sidewall. By so doing, the problem of mode conversion by refraction (or the lack thereof) in slow formations is mitigated.

J. Zemanec, in U.S. Pat. No. 4,516,228, issued May 7, 1985 provides a borehole logging system that employs a compressional wave transmitter and a direct-excitation shear wave transmitter. The transmitters are alternately fired to impart compressional and shear waves in the surrounding borehole formations. A single bender-bar receiver, spaced apart from the transmitter in the borehole is alternately gated so that the voltages across its pair of piezoelectric planar surfaces are subtracted during the expected period of compressional wave output and added during the expected arrival time period of asymmetrical motion of the receiver to provide shear wave output. It is of interest that the bender-bar receiver transducer was isolated from the logging sonde by a soft supporting pad.

F. A. Angonna et al. in U.S. Pat. No. 4,649,525, issued Mar. 10, 1981 disclose an acoustic logger that employs a bender-type transducer as a point source of an acoustic shear wave. The bender transducer includes opposed unrestricted planar surfaces mounted within a liquid-filled compartment within the tool. The surfaces of the transducer are emplaced longitudinally along the axis of the tool and exposed to the coupling liquid. One or more bender bars may also be used as receivers. The active faces of the receivers are oriented substantially in the same direction as is the active surface of the transmitter. As with the previous patent, the transducers are resiliently supported on soft mounts.

Another acoustic logging sonde that employs a bender-type transducer is described in U.S. Pat. No. 4,782,910, issued Nov. 8, 1988 to C. C. Shaw. A bender-bar transducer has a flat piezoelectric element secured to a fiat elongated inert element. The ends of the inert element are hinged on a supporting rectangular frame inside a rectangular opening therein. The sides of the active and inert elements are exposed so that when a voltage is applied, a dipole acoustic wave is generated by the transducer. The frame serves as a reaction mass. The assembly including frame and elements are resiliently suspended by rubber straps within a compartment in the sonde, thereby to acoustically isolate the frame and active elements from the sonde. In one embodiment, dual piezoelectric elements are secured to opposite sides of the inert element. The edges of the frame serve as baffles to acoustically separate the two exposed surfaces of the active elements.

Vogel et at. in U.S. Pat. No. 4,834,209, issued May 30, 1989 disclose a transverse wave logging tool that consists of a plurality of sets of transducers that are mounted around a cylindrical mandrel. One set of four transducers acts as a set of transmitters; a second set of four transducers acts as a set of receivers. The active faces of the transducers are characterized by two orthogonal dimensions, one of which is a half wavelength long relative to the acoustic excitation energy applied to the transmitter transducer and the transverse-wave formation velocity. The transmitter transducer generates transverse S-waves in the formation by direct excitation of the borehole sidewall along the normal thereto rather than by critical-angle refraction. Receiver transducers detect converted-compressional waves resulting from transverse waves that were generated by the acoustic excitation energy.

A transducer employing piezoresistive elements is taught in U.S. Pat. No. 4,949,316, issued Aug. 14, 1990 to K. W. Katahara. The active element may be a flat silicon plate upon which the piezoresistors are formed. The plate is supported from its ends by springs that are secured within an oil-filled compartment in a sonde.

J. Zemanec et at., in a paper published in *The Log Analyst* for May/June, 1991, discusses shear wave logging using multiple sources. He explains the concept of direct excitation and the generation of flexural waves by a dipole transmitter. He illustrates the difference between asymmetrical dipolar flexural waves and omnidirectional compressional waves that are generated by a monopolar transmitter. Graphs are presented showing the dependence of the group and phase velocities on signal frequency.

SUMMARY OF THE INVENTION

The acoustic logging tool assembly of this invention is comprised of an elongated sonde that includes a plurality of segments that are rotatable relative to each other. A first driver transducer is mounted in a first segment for launching a dipolar beam toward the sidewall of a borehole along a selected azimuth and along its complement for exciting asymmetrical flexural waves in the sidewall material. A first dipolar receiver is mounted in a second segment, oriented parallel to the selected azimuth for receiving acoustic waves due to the propagation of flexural waves through the sidewall material. A second transmitter transducer and a second dipolar receiver transducer are mounted respectively in third and fourth segments which may be rotated in quadrature and optionally in parallel with the first and second segments.

In an embodiment of this invention, the respective transmitter transducers may be of the dipole bender bar type, mounted in a compartment in the sonde. The bender bar element consists of an elongated inert element, on each side of which are secured a polarized piezoelectric crystal. The inert element has opposite end portions that are anchored firmly to the mass of the sonde inside the compartment. The mass of the sonde provides a stable inertial reaction mass against which the driver transducer reacts when activated by an electrical trigger pulse.

In an embodiment of this invention, the segments containing the transmitter transducers are acoustically isolated from the segments containing the receiver transducers by an acoustic isolator.

In another embodiment of this invention, monopole transmitter transducers are mounted in the first and third segments and monopole receivers are mounted in the second and fourth segments.

In yet another embodiment of this invention, a bias voltage is applied to the dipolar transmitter transducers to prevent depolarization in the presence of elevated temperatures in the borehole.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 1 is a schematic illustration of the sonde of this invention as employed in a borehole;

FIG. 3B is a symbolic cross section of a borehole showing the mechanism of flexural-wave generation;

FIG. 7 is an external isometric view of the acoustic isolator;

FIG. 8A is a cross section along lines 8A—8A of FIG. 7;

FIG. 8B is a showing of a spool section; and

FIG. 9 is a wiring diagram of the firing circuit of the dipole transmitter driver unit.

DETAILED DESCRIPTION OF THE PREFERRED EMBODIMENT

Figure 2A:
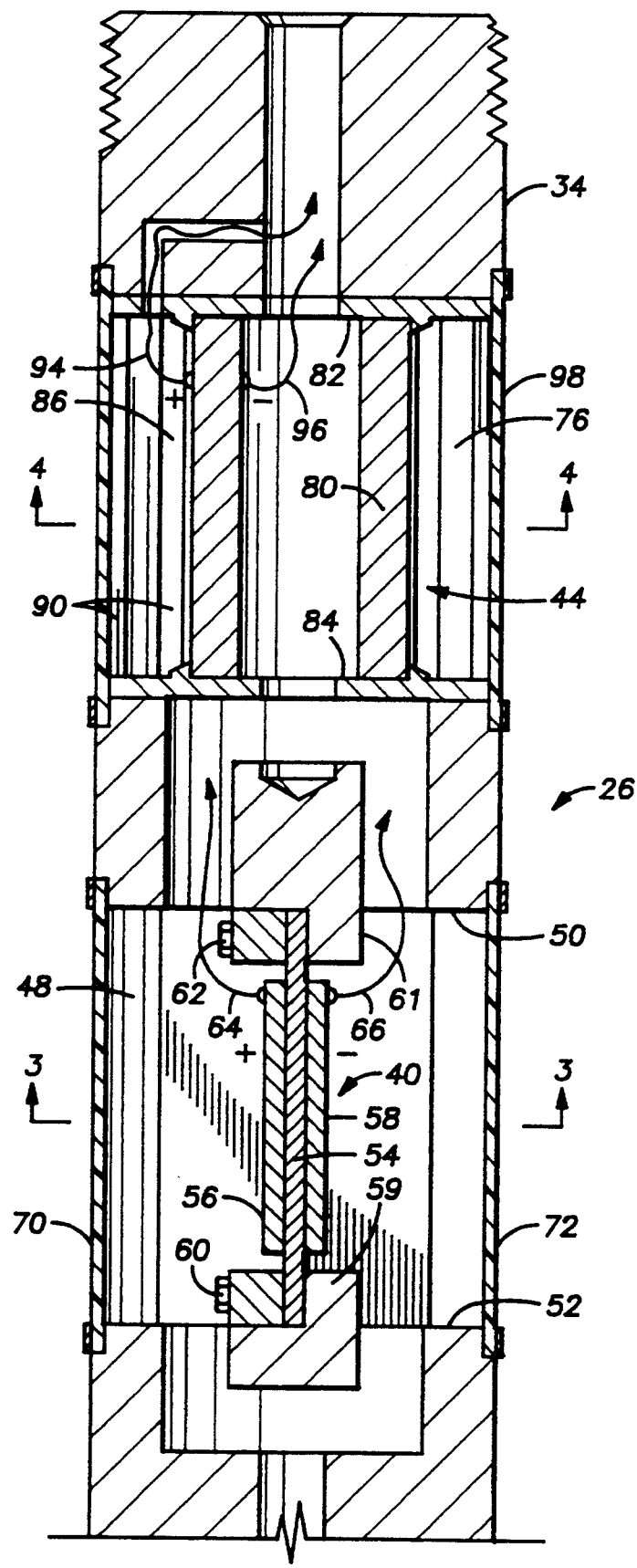
FIGS. 2A and 2B show the construction of the transmitter assembly.

FIG. 1 shows a borehole 10 drilled into the earth 12. The borehole is usually filled with a drilling fluid that is used to lift drill cuttings to the surface 14 of the earth. It is of economic interest to measure selected parameters of the subsurface formations. To that end, a well-logging sonde assembly, generally shown as 16, is lowered into the borehole 10 on the end of a cable 18 from a draw works 20 over a depth-measuring sheave 22 that is supported from derrick 24. Instrumentation of any suitable type 23 is provided at the surface and/or in the sonde, such as at 25, to process and record the data gathered by one or more sensors, such as by an acoustic transmitter transducer assembly 26 and an acoustic receiver transducer assembly 28, mounted in sonde 16. The transmitter and receiver assemblies are isolated from each other by an acoustic isolator 29. In some operations, such as for highly-deviated boreholes, the sonde may be supported from flexible tubing or drill pipe.

In a typical operating cycle, transmitter assembly 26 is triggered to insonify sidewall 30 of well bore 10. The acoustic wavefield propagates through the formations, i.e. the earth surrounding the borehole. Its arrival is detected by receiver assembly 28 a few hundreds or thousands of microseconds later. As previously explained, the slowness in terms of microseconds of wavefield travel time per unit of length is one parameter of interest. The physical principles governing asymmetrical flexural waves in contrast to omni-directional compressional waves is well known, hence, further exegesis is unnecessary.

Figure 2B:
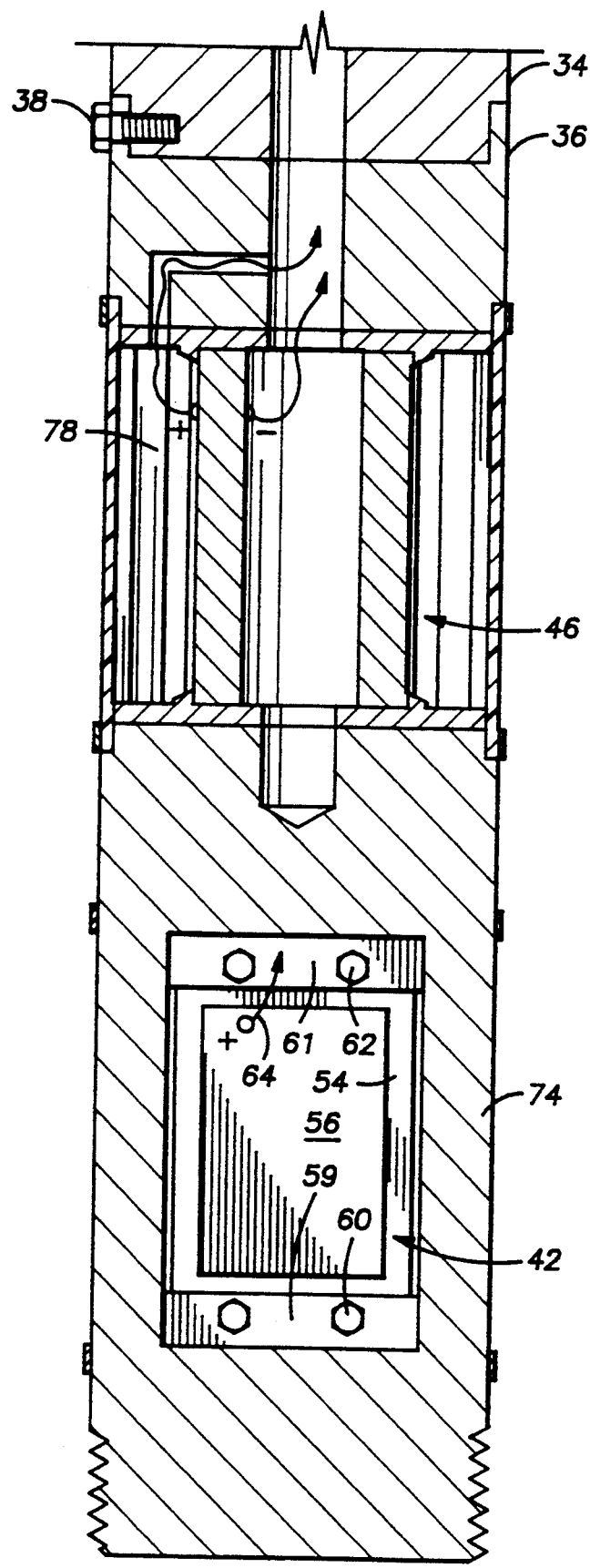

The above paragraphs are a general overview of the function of an acoustic logging tool. Let us now examine the specific novel features of this invention. FIGS. 2A and 2B (shown in two halves for illustrative clarity) show the transmitter assembly 26 which includes two segments or modules 34 and 36. Modules 34 and 36 are axially rotatable relative to each other and may be locked into a desired configuration by one or more locking bolts such as 38. Each one of the modules 34 and 36 contains respectively, a dipole transmitter transducer 40, 42 and a monopole transmitter transducer 44, 46 (referred to hereinafter for simplicity as a dipole unit and a monopole unit). The respective units are spaced one to two feet apart along the modules. The body of the transmitter assembly is made of suitable material such as stainless steel, on the order of three to four inches in diameter and five or six feet long. Each module has two compartments, one for containing a dipole unit and one for containing monopole unit. Axial longitudinal bores through the modules communicate with the compartments to furnish means for the passage of electrical leads and for filling the compartments with an acoustic coupling fluid. The ends of the transmitter assembly are threaded for mating the transmitter assembly to other assemblies on the sonde as needed.

Figure 3A:
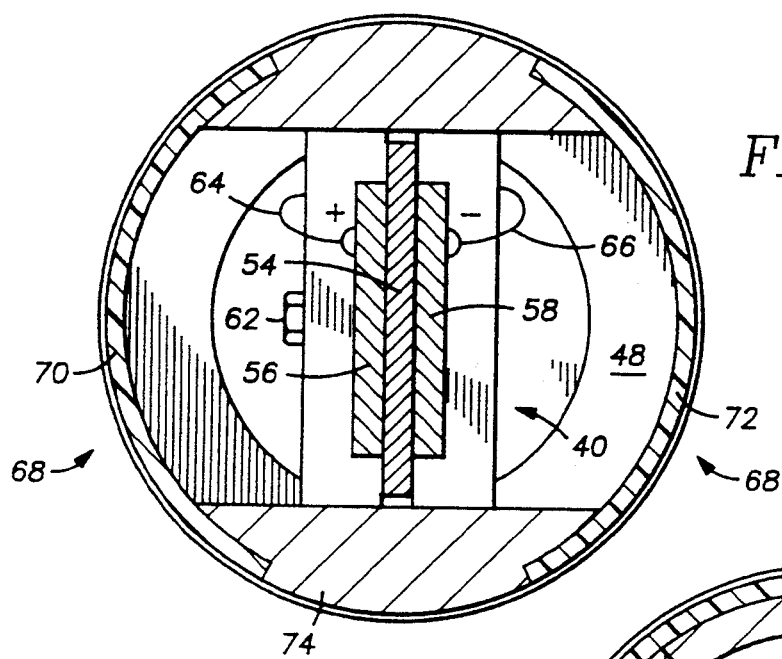
FIG. 3A is a cross section along lines 3—3 of FIG. 2A.

Referring now to FIGS. 2A and 2B and also to FIG. 3A which is a cross section along line 3A—3A of FIG. 2A, dipole unit 40 in module 34 is shown rotated 90° (is in quadrature) with respect to dipole unit 42 in module 36. The two dipole units could, of course be optionally rotated in parallel alignment with each other. Dipole units 40 and 42 and their mounting arrangement are substantially identical; common reference numbers will be used to designate common parts, except that primes have been added to the common reference numbers in FIG. 2B to avoid confusion with FIG. 2A.

Each of the dipole units 40 and 42 are mounted in a compartment such as 48 that is arranged parallel to the longitudinal axis of the sonde. The compartments have internal opposite end portions 50 and 52 as shown in FIG. 2A. A dipole bender-bar transmitter unit such as 40 consists of a rectangular inert element 54 of suitable material having a low coefficient of thermal expansion such as Kovar, the principle axes (meaning the length and width) of which are about two inches by four inches and about 0.10 inch thick. Substantially identical polarized piezoelectric ceramic crystals, 56 and 58, having opposed planar surfaces, are cemented on each side of inert element 54 by a conductive high-temperature epoxy. The positive face of crystal 56 and the negative face of crystal 58 are exposed to the acoustic coupling fluid that commonly fills a compartment such as 48. It is important to mount substantially identical crystals on each side of inert element 54 in order to maintain front and back mechanical symmetry. That is necessary so that the pattern of the radiated wavefield will be symmetrical, front-to-back, with virtually no side lobes. The inert element 54 is firmly secured at each end to clamping fixtures 59 and 61, which are an integral part of the opposite end portions 50 and 52 of compartment 48 of module 34. The ends are fastened to the fixtures 59 and 61 by bolts 60 and 62 or by any other convenient means. Leads 64 and 66 provide means for applying a trigger signal to activate the bender-bar driver transducer such as 40. A laterally-disposed Janusian window 68 is provided for each dipole compartment (FIG. 3A). The opposite sides of window 68 are sealed by covers 70, 72 of any well-known acoustically-transparent material such as rubber or fiberglass. A septum 74 separates opposite sides of the window 68 for reasons that will be discussed later.

In operation, a trigger-pulse signal, on the order of 3000 volts, is applied at 500 millisecond intervals to a bender-bar driver transducer such as 40 as indicated by the circuit diagram of FIG. 9. The power source for the trigger signal is preferably included in the instrumentation package 23 although the source could be a battery that is contained in the instrumentation module 25 in the sonde itself. A charged capacitor 43 is discharged, upon command, through switch 45 which may be an FET to generate an electrical trigger pulse. Application of a trigger pulse through transformer 41 causes the dipole unit to abruptly snap laterally in one direction as shown symbolically in FIG. 3B to generate a differential-pressure wave field in the coupling fluid that fills compartment 48. Propagating from the sonde through the fluid in the borehole, the differential-pressure wavefield excites asymmetrical flexural waves 65 and 67 in the borehole sidewall 30. That wave field takes the form of a directed compressional (positive) acoustic radiation field, the principal lobe of which propagates through one portion of Janusian window 68 along a selected azimuth 57 and a concomitant directed rarefaction (negative) radiation field that propagates along the complement 59 of azimuth 57 through the opposite portion of the Janusian window. The septum 74 serves as a baffle to prevent mutual interference between the two radiation fields. The principle lobes of the positive and negative radiation fields are directed orthogonally to the planar surfaces representing the principle axes of the dipole unit. By reason of the preferred mounting method of the dipole unit, the entire mass of the sonde provides an effective inertia mass against which the dipole unit reacts when driven by the trigger signal thereby to create a much more powerful acoustic wavefield than would otherwise be possible.

Figure 4:
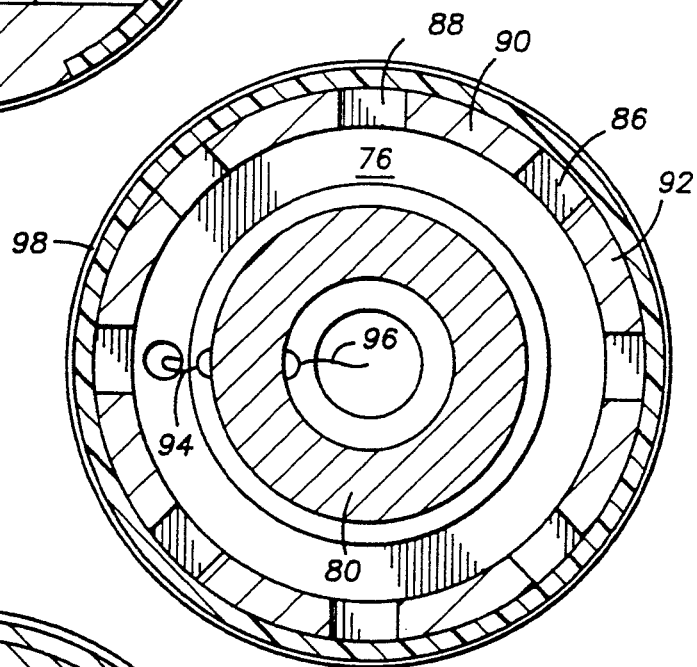
FIG. 4 is a cross section along lines 4—4 of FIG. 2A.

Refer again now to FIGS. 2A, 2B and also to FIG. 4, which is a cross section along line 4—4 of FIG. 2A. Compartment 76 in module 34 and compartment 78 in module 36 contain monopole driver units 44 and 46. The units are substantially identical so only one will be described in detail. The monopole unit consists of a conventional cylindrical expander-type polarized piezoelectric ceramic element 80 that is secured by any convenient means to mounting pads 82 and 84 formed from any desired material. That portion of module 34 that forms the wall of compartment 76 is longitudinally slotted around its entire perimeter. The slots such as 86 and 88, form openings (FIG. 4) which are separated by a plurality of longitudinally-disposed slats such as 90 and 92 that are provided for structural integrity of the module. Electrical leads 94 and 96 provide means for applying a periodic trigger pulse from a suitable signal source (not shown) to monopole unit 80. An acoustically transparent sheath 98 of suitable material such as rubber or fiberglass seals the slotted openings. When excited by an electrical trigger pulse, monopole unit 44 emits an omnidirectional, axially-symmetrical compressional wave field that propagates through the slotted openings, through the borehole fluid, to uniformly irradiate the borehole sidewall 30 for generating compressional waves and mode—converted shear waves therein. For obvious reasons, the axial orientation of the monopole unit is immaterial.

Figure 6:
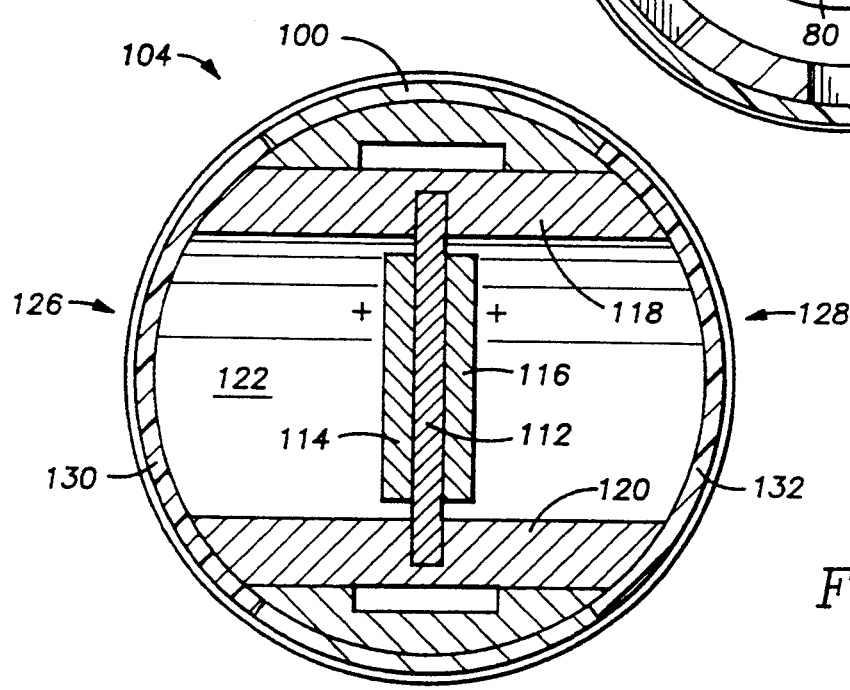
FIG. 6 is a cross section along line 6—6 of FIG. 5B.
Figure 5A:
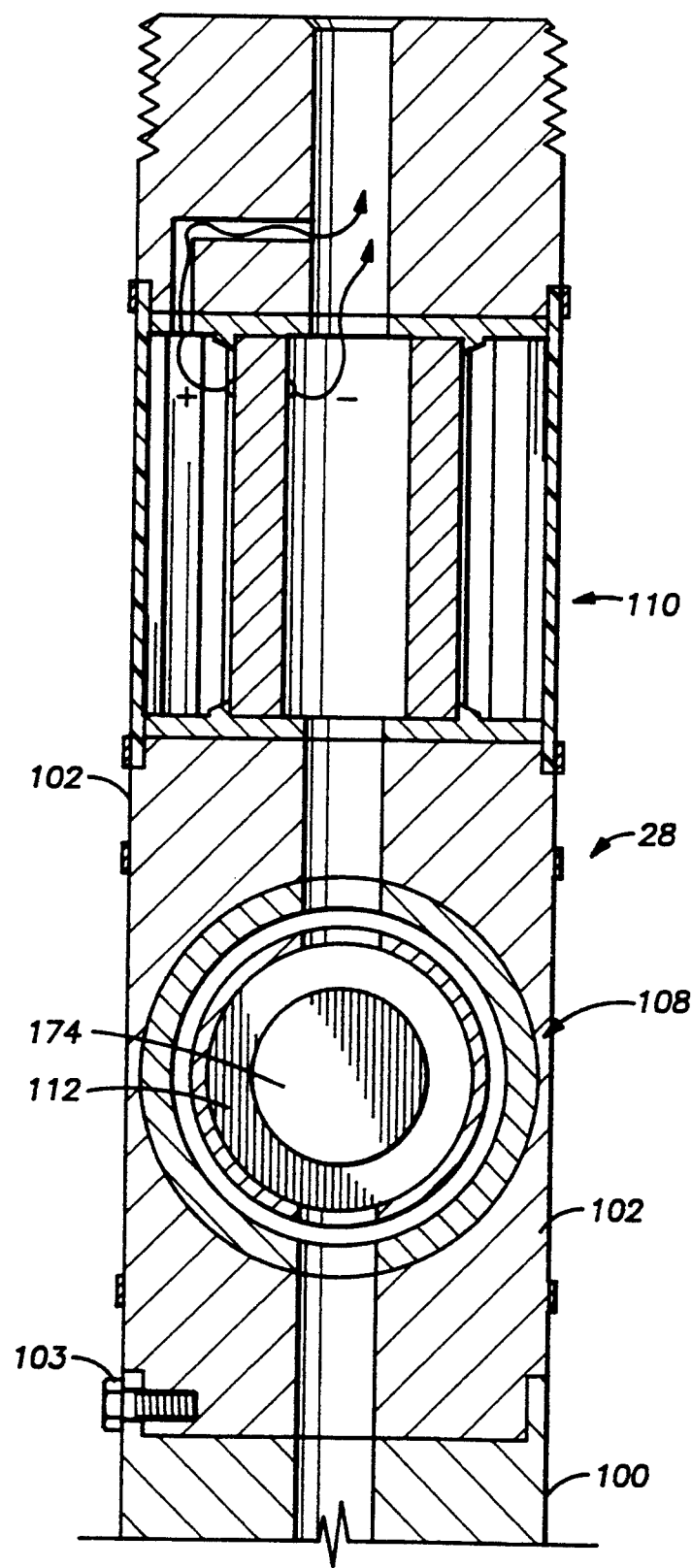
FIGS. 5A and 5B show the construction of the receiver assembly.
Figure 5B:
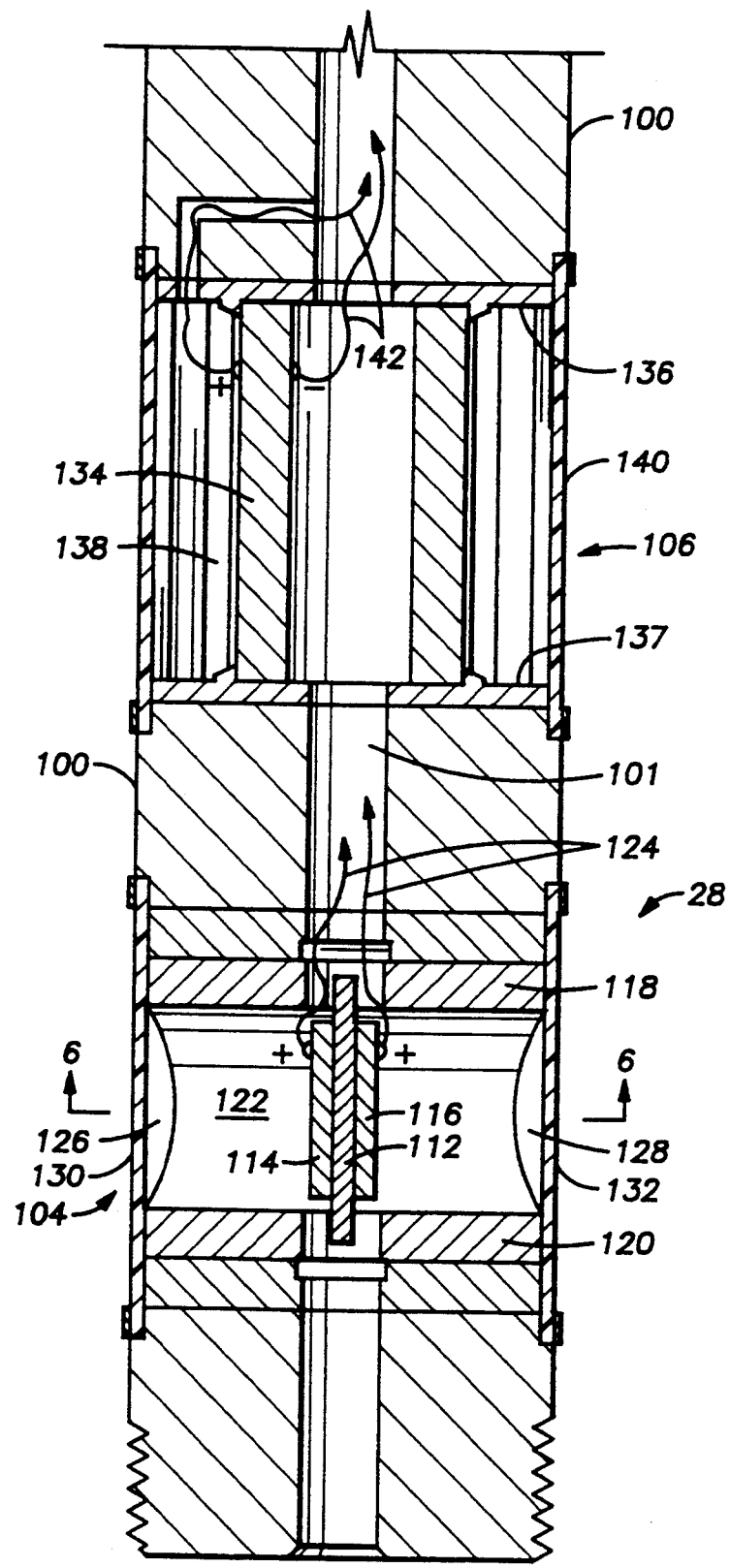

The receiver assembly 28 of this invention consists of two stainless steel segments or mandrels 100 and 102 of the same diameter as that of the transmitter assembly as shown in FIGS. 5A, 5B and 6. An internal longitudinal bore 101 is provided the same as for the transmitter assembly. The two mandrels 100 and 102 are axially rotatable relative to each other and may be locked into place by any desired means such as by one or more locking bolts 103. Each mandrel includes a plurality of compartments for containing a plurality of dipole receiver transducers such as 104 and 108 and a plurality of monopole receiver transducers such as 106 and 110 (dipole receivers and monopole receivers for short). The compartments are filled with an acoustic coupling fluid. In FIGS. 5A and 5B, one dipole receiver and one monopole receiver are shown in each mandrel but preferably arrays of at least four or more of each type of receiver may be used in each mandrel. In FIGS. 5A and 5B, the receivers 104 and 106 are shown rotated 90° with respect to receivers 108 and 110 but they may optionally be rotated in axial alignment with each other. The receivers of like types are spaced about six inches apart. The entire receiver assembly may be on the order of ten feet long. Each end of the receiver assembly unit is threaded (not shown) for mating to other assemblies that make up the sonde.

Dipole receivers 104 and 108 are substantially identical ceramic flexural-disk transducers. The receiver element consists of an inert diaphragm 112 on each side of which are cemented polarized ceramic piezoelectric disks 114 and 116. The polarity of the outwardly-facing planar surfaces of the piezoelectric disks are positive as indicated in FIGS. 5A and 6; the inner faces are grounded through inert diaphragm 112. The receiver elements are fastened to mounting fixtures such as 118 and 120 in a compartment such as 122. Electrical leads 124 conduct the dipole receiver signals to a suitable multi-channel signal utilization device of any well-known type such as surface unit 23. Compartment 122 is furnished with oppositely-disposed acoustic windows 126 and 128 that are sealed by acoustically transparent covers 130 and 132. Because of their dipole construction, the dipole receivers are binaurally sensitive only to differentially-applied pressure wavefields, which cause bending of the active element in one direction, such as are produced by flexural waves. They are unresponsive to an axially-uniform compressive wavefield by reason of the direction of polarization of the piezoelectric bender elements.

Monopole receivers 106 and 110 are conventional expander-type cylindrical polarized ceramic piezoelectric transducer elements such as 134, of substantially the same construction as the monopole transmitter units. Since they are identical, only receiver 106 will be described. Active element 134 is supported by mounting fixtures 136 and 137 inside its compartment 138. The walls of compartment 138 are slotted and sealed by an acoustically transparent material 140. Electrical leads 142 conduct the monopole receiver signals to a signal utilization device (not shown) of conventional type through bore 101. The monopole receivers 106 and 110 are responsive to an axially-symmetrical uniformly-applied pressure wavefield because they respond to compression and expansion. But they are not sensitive to a differential-pressure field. As with the monopolar transmitter units, the azimuthal orientation of the monopolar receivers is not of concern.

The transmitter assembly 26 is separated from the receiver assembly 28 by an acoustic isolator 29, as shown in FIG. 1, so that the acoustic signals radiated by the transmitters will not travel directly up the body of the sonde 16 to interfere with arriving formation signals. The isolator section 29 has a diameter the same as that of the transmitter and receiver assemblies and may be about five feet long. The isolator section 29 of this invention is sub-flexible, i.e. it will bend around curves of moderate radii but it is sufficiently stiff that it can be maneuvered through highly-deviated boreholes without buckling. It is composed of a plurality of interlocking compound vertebrate links 152, 153, 154 such as is partially shown in the external isometric view of FIG. 7 and in FIG. 8A, which is a cross section along line 8A—8A of FIG. 7. A typical compound link includes a hollow spool such as 156 (FIG. 8B) having a shank 158 and expanded opposite end portions 159 and 160. A resilient boot 162 is vulcanized to and covers the shank and expanded end portions of the spool as shown in FIG. 8A. A plurality of spools are arranged end-to-end, in tandem alignment, there being a first and a last spool. A plurality of paired split-shell sections such as 164 and 165, having an internal recessed portion 166 are provided. Each of the paired split-shell sections, when bolted together, externally embraces the enlarged end portions of two adjacent boot-covered spools as shown in FIG. 8A. A separator 168, which may be resilient, provides spacing and clearance between longitudinally-adjacent split shells. The first and last spools are coupled to threaded terminator subs 170 and 172 for connection to other assemblies that make up the logging sonde 16. In assembling the vertebrate links together, the split-shell sections are alternately rotated 90° with respect to each other as shown in FIGS. 7 and 8A. Each split-shell pair is keyed, by keys 189 and 182, to the resilient boot that covers the associated spools so that the vertebrate links will not rotate relative to one another. A flexible liner 174 may be inserted through the hollow spools for the passage of electrical signal leads if needed.

In the preceding descriptions, items and techniques that are well known to the art and conventional such as signal processing, recording and display instrumentation as well as wiring and electrical connectors between modules and assemblies have not been shown since they are not germane to this invention.

In operation, either the monopolar units may be employed alone to study compressional and shear waves or only the dipolar units may be pressed into service to favor flexural-wave reception or the monopolar and the dipolar units may be fired in alternate cycles in any combination as required by the particular field problem to be addressed. Sets of dipolar transmitters and receivers may be arranged in parallel alignment or one set may be oriented in quadrature with respect to the other set. The receiver units may be programmed to receive and record signals individually or they may be arranged in interconnected arrays for signal enhancement and noise cancellation in a manner well known to the art.

As explained earlier, the dipolar transmitter units are fired using a 3000-V boxcar function having a duration of 240 μs, at a repetition rate of about 500 milliseconds. The resonant frequency of the dipolar transmitter transducer is preferably in the range of 0.7 to 2.0 kHz because flexural waves do not exhibit significant dispersion in that portion of the acoustic spectrum. In accordance with FIG. 9, the inert element 54 of dipole unit 40 is coupled to the positive side of transformer 41. The negative side of transformer 41 is coupled to the negatively-polarized face of crystal 58 and to the positively-polarized face of crystal 56 through capacitor C. The polarity of the driving voltage is unlike the polarity of the exposed face of the crystal 56. Each time that the dipole unit 40 is pulsed, crystal 56 is necessarily driven backwards by the applied electric field whose polarity is opposite to the crystal polarization.

It is known that polycrystaline PZT material must be poled by application of a high intensity external field. The poling process is not instantaneous but, for an electrical field of any given level, the process requires a soaking time that is an inverse function of temperature. Typical constants might be 50 V/mil at 150° C. applied to the material for 10 seconds. At room temperature, the time constant might be 2000 seconds. The process is reversible.

During the normal 240 μs duty cycle of the dipole unit, a reverse voltage of 19 V/mil is applied to the positively-poled face of crystal 56. Elevated temperatures of 200° C. are commonly encountered in even moderately-deep boreholes. Each time that the dipole unit is triggered at that temperature, crystal 56 is depolarized by a small finite amount. The effect is cumulative. After about 15 minutes of continuous operation at a cycle time of 1 second, and at an ambient temperature of 200° C., it was found that the original polarization of crystal 56 became completely reversed and the dipole transmitter unit became inoperative.

We have found that a constant positive DC bias voltage of 400 volts, applied through resistor R, to the positively-polarized face of crystal 56, as shown in FIG. 9, prevents depolarization even after extended operation of the dipole transmitter unit at elevated ambient temperatures that would otherwise result in depolarization.

The description has been written with some degree of specificity and is intended to be exemplary only and is not to be taken in any way to be limiting of the scope and spirit of this invention which is limited only by the appended claims.

What is claimed is:

1. An improved acoustic logging tool assembly adapted to be drawn through a borehole for measuring selected properties of the sidewall material of the borehole, comprising:

a sonde, said sonde including a plurality of segments that are rotatable relative to one another;

a first driver transducer mounted on a first one of said segments for launching oppositely-directed acoustic beams having principle axes directed toward the sidewall of the borehole along a selected azimuth and along the complement thereof for exciting asymmetrical flexural waves in said sidewall material;

at least a second segment for containing at least a first receiver transducer having binaural axes of sensitivity, said second segment being spaced-apart from said first segment, the binaural axes of sensitivity being aligned parallel with said selected azimuth and its complement for receiving acoustic waves resulting from propagation of said flexural waves through said sidewall material;

a second driver transducer, substantially identical with said first driver transducer, mounted on a third segment adjacent said first segment;

at least a fourth segment for containing at least one second receiver transducer substantially identical with said first receiver transducer, said fourth segment being adjacent to said second segment; and means for rotating said third and fourth segments relative to said first and second segments in a selected one of two discrete axial acoustic beam orientations; and wherein each said first and second driver transducer comprises a dipole bender-bar transducer including an elongated inert element, the opposite ends of which are fixedly secured to respective ones of said first and third segments which form stable inertial reaction masses; first and second polarized ceramic piezoelectric crystals each having an exposed face and an inner face, the inner faces of the respective crystals being conductively secured to opposite side of said inert element, the exposed faces of the crystals being oppositely polarized.

2. The assembly as defined by claim 1, comprising:

a sub-flexible acoustic isolation means for acoustically isolating the second and fourth segments from said first and third segments.

3. The assembly as defined by claim 1, wherein:
each of said first and third segments includes a compartment disposed parallel to the longitudinal axis of said sonde for supporting a dipole bender-bar transmitter transducer, said compartment having lateral Janusian windows and internal longitudinally-disposed opposite end portions, said windows being sealed by acoustically transparent covers.

4. The assembly as defined by claim 3, comprising:
means for anchoring the opposite ends of the inert element of said dipole bender bar transducer to the opposite end portions of said compartment and in parallel alignment with the longitudinal axis of said sonde.

5. The assembly as defined by claim 1, wherein:
the central axes of the principle lobes of said acoustic beams are directed orthogonally to the borehole sidewall.

6. The sonde as defined by claim 4, comprising:
a septum between said acoustically transparent covers, said septum providing means for baffling said oppositely-directed acoustic beams.

7. The assembly as defined by claim 1, comprising:
at least one omnidirectional compressional-wave transmitter transducer mounted in each of said first and third segments; and
at least one omnidirectional compressional-wave receiver transducer mounted in each of said second and fourth segments.

8. The assembly as defined by claim 1, wherein:
said second and fourth segments each include a plurality of binaurally-sensitive dipole receivers and a plurality of omnidirectionally sensitive monopole receivers.

9. The assembly as defined by claim 1, comprising:
a bipolar circuit means for applying an electrical trigger pulse to said dipolar bender-bar transmitter transducer, a first pole of said bipolar circuit means being coupled to said inert element and a second pole of said bipolar circuit means being coupled to the exposed faces of said first and second piezoelectric crystals, the exposed face of said first crystal being of the same polarity as that of said second pole of said bipolar circuit means and the exposed face of said second crystal being of unlike polarity; and
means for applying a bias voltage to the exposed face of said second crystal, the polarity of the bias voltage being the same as the polarity of said exposed face of said second crystal.

10. The assembly as defined by claim 2 wherein:
in a first selected axial orientation, the principle axes of the acoustic beams of said second driver transducer and the binaural axes of sensitivity of said second receiver transducer are in quadrature with respect to said selected azimuth and its complement; and
is a second selected axial orientation, the principle axes of the beams of said second driver transducer and binaural axes of sensitivity of said second receiver transducer are aligned in parallel with said selected azimuth and its complement.

11. An acoustic logging tool assembly for measuring selected properties of the sidewall material in a borehole, comprising:
a sonde having rotatable segments;
at least one dipole driver transducer mounted on said sonde, said dipole transducer including first and second piezoelectric crystals each having an exposed face and an inner face that is conductively fastened to a side of an elongated inert element the opposite ends of which are fixedly fastened to said sonde which acts as a stable inertial reaction mass, the exposed faces of said crystals being oppositely polarized;
at least one receiver transducer having binaural axes of sensitivity mounted in said sonde;
a bipolar circuit means for applying an electrical trigger pulse to said dipolar driver transducer, a first pole of said bipolar circuit means being coupled to said inert element and a second pole of said bipolar circuit means being coupled to the exposed faces of said first and second piezoelectric crystals, the exposed face of said first crystal being of the same polarity as that of said second pole of said bipolar circuit means, the exposed face of said second crystal being of unlike polarity; and
means for maintaining the polarization of said driver transducer by applying a bias voltage to the exposed face of said second crystal, the polarity of the bias voltage being the same as the polarity of said exposed face of said second crystal.

* * * * *